(12) United States Patent
Soto et al.

(10) Patent No.: US 7,675,573 B2
(45) Date of Patent: *Mar. 9, 2010

(54) GLOBAL MOTION ADAPTIVE SYSTEM WITH MOTION VALUES CORRECTION WITH RESPECT TO LUMINANCE LEVEL

(75) Inventors: Eduardo Rogelio Corral Soto, Toronto (CA); Peter Swartz, San Jose, CA (US); Andrew MacKinnon, North York (CA)

(73) Assignee: Genesis Microchip Inc., Santa Clara, CA (US)

( * ) Notice: Subject to any disclaimer, the term of this patent is extended or adjusted under 35 U.S.C. 154(b) by 1093 days.

This patent is subject to a terminal disclaimer.

(21) Appl. No.: 11/332,841

(22) Filed: Jan. 12, 2006

(65) Prior Publication Data

US 2006/0187345 A1 Aug. 24, 2006

Related U.S. Application Data

(63) Continuation-in-part of application No. 11/143,510, filed on Jun. 1, 2005, now Pat. No. 7,471,336.

(60) Provisional application No. 60/654,263, filed on Feb. 18, 2005.

(51) Int. Cl.
*H04N 7/01* (2006.01)
(52) U.S. Cl. .................................... 348/452
(58) Field of Classification Search ............... 348/452, 348/451, 441, 448, 413.1, 416.1; 375/240.16, 375/240.22, 240.27
See application file for complete search history.

(56) References Cited

U.S. PATENT DOCUMENTS

| | | | |
|---|---|---|---|
| 5,602,591 A * | 2/1997 | Saiki ........................... | 348/452 |
| 5,682,205 A | 10/1997 | Sezan et al. | |
| 5,784,115 A * | 7/1998 | Bozdagi ....................... | 348/452 |
| 5,786,872 A * | 7/1998 | Miyazaki et al. ............ | 348/669 |
| 6,380,978 B1 * | 4/2002 | Adams et al. ................ | 348/452 |
| 6,459,455 B1 | 10/2002 | Jiang et al. | |
| 7,471,336 B2 * | 12/2008 | Corral Soto ................. | 348/452 |
| 2002/0196362 A1 | 12/2002 | Yang et al. | |

FOREIGN PATENT DOCUMENTS

| | | |
|---|---|---|
| EP | 0 242 935 A1 | 10/1987 |
| EP | 0 376 330 A2 | 7/1990 |
| EP | 0 697 788 A2 | 2/1996 |
| EP | 0 739 129 A2 | 10/1996 |
| EP | 0 652 678 B1 | 12/1999 |

OTHER PUBLICATIONS

Chinese Office Action dated Nov. 28, 2008 in Chinese Patent Application No. 200610071183.1.
Seungjoon et al., "Motion Compensation Assisted Motion Adaptive Interlaced-to-Progressive Conversion," IEEE Transactions on Circuits and Systems for Video Technology, vol. 14, No. 9, Sep. 2004, p. 1139 sec II, p. 1141, sec III B, p. 1143, sec III D and pp. 1145-1147 sec IV.

(Continued)

*Primary Examiner*—Paulos M Natnael
(74) *Attorney, Agent, or Firm*—Beyer Law Group LLP; Lisa K. Jorgenson

(57) ABSTRACT

Global-adaptive deinterlacing systems and methods for reducing scintillation and feathering artifacts. Motion adaptive deinterlacing (MADI) local motion quantization thresholds are adaptively adjusted according to the amount of global motion present in the video sequence, thereby minimizing scintillation and feathering artifacts when deinterlacing the fields. A set of global motion scenarios are defined for the purpose of classifying fields, and a number of global motion indicators are used to detect on a field-by-field basis different global motion scenarios.

14 Claims, 19 Drawing Sheets

OTHER PUBLICATIONS

Search Report from Australian Patent Office mailed Aug. 25, 2006 for Singapore Patent Application No. SG 200600919-5.

Choi et al., "Motion Adaptive 3D Y/C Separation Algorithm Using Motion Estimation and Motion Compensation," IEEE Transactions on Consumer Electronics, vol. 47, No. 4, Nov. 2001, pp. 770-778.

Vandendorpe et al., "Motion-compensated conversion from interlaced to progressive formats," Signal Processing Image Communication, Elsevier Science Publishers, Amsterdam, vol. 6, No. 3, Jun. 1, 1994, pp. 193-211, XP000451925, ISSN: 0923-5965.

International Search Report dated Jun. 1, 2005 from European Patent Application No. EP 04 25 8048.

European Search Report dated Jul. 19, 2006 from European Patent Application No. EP 06 25 0891.

* cited by examiner

| Scenario | Detected Global Motion | | | |
|---|---|---|---|---|
| | Vertical Pattern | High | Medium | Low |
| Low | 0 | 0 | 0 | 0 |
| Medium | 0 | 0 | 0 | 1 |
| | 0 | 0 | 1 | 0 |
| High | 0 | 0 | 1 | 1 |
| | 0 | 1 | 0 | 0 |
| | 0 | 1 | 0 | 1 |
| | 0 | 1 | 1 | 0 |
| Low-Vertical | 1 | 0 | 0 | 1 |
| Medium-Vertical | 1 | 0 | 1 | 0 |
| | 1 | 0 | 1 | 1 |
| High-Vertical | 1 | 1 | 0 | 0 |
| | 1 | 1 | 0 | 1 |
| | 1 | 1 | 1 | 0 |
| | 1 | 1 | 1 | 1 |

"GLOBAL MOTION ADAPTIVE SYSTEM WITH MOTION VALUES CORRECTION WITH RESPECT TO LUMINANCE LEVEL"

CROSS REFERENCE TO RELATED APPLICATIONS

This patent application is a Continuation in Part of U.S. patent application Ser. No. 11/143,510 filed on Jun. 1, 2005 now U.S. Pat. No. 7,471,336, entitled that takes priority under 35 U.S.C. 119(e) to U.S. Provisional Patent Application No. 60/654,263 filed on Feb. 18, 2005 entitled "GLOBAL MOTION ADAPTIVE SYSTEM WITH MOTION VALUES CORRECTION WITH RESPECT TO LUMINANCE LEVEL" that is incorporated by reference in its entirety.

FIELD OF INVENTION

The invention pertains in general to motion adaptive deinterlacing, and in particular to systems and methods for adaptively adjusting local motion thresholds according to global motion indicators in order to reduce scintillation and feathering artifacts.

BACKGROUND

Interlaced video signals comprise two video fields, one for the odd lines and one for the even lines of an image. This is due to the image capture process, wherein the camera outputs the odd lines at one instant in time and the even lines slightly later. This creates a temporal shift between the odd and even lines of the image, which needs to be addressed in frame based processing systems. A deinterlacing process generally attempts to overcome this problem by assembling a clean frame from the two fields.

Since the temporal shift between the two fields introduce feathering and scintillation artifacts, motion adaptive deinterlacing (MADI) techniques have been proposed in order to reduce such artifacts. Some MADI techniques use local motion threshold values that can be adjusted manually in order to improve the performance of the de-interlacer on a specific problematic video sequence, albeit possibly at the cost of sacrificing the performance (and re-introducing de-interlacing artifacts) in other video sequences.

Therefore, instead of manually adjusting the MADI thresholds in order to "Pass" a specific video sequence, it is desirable to develop a new adaptive system that adjusts the local MADI thresholds automatically and adaptively.

SUMMARY OF THE INVENTION

Disclosed are global-adaptive deinterlacing systems and methods for reducing scintillation and feathering artifacts. MADI local motion quantization thresholds are adaptively adjusted according to the amount of global motion present in the video sequence, thereby minimizing scintillation artifacts (generally present in low motion images) and feathering artifacts (generally present in high motion images) when deinterlacing the fields. A set of global motion "scenarios" are defined for the purpose of classifying fields, and a number of global motion indicators are used to detect on a field-by-field basis different global motion scenarios. The global motion indicators are corrected to reduce Luma dependencies, thereby improving reliability and robustness. Depending on the global motion scenario of a field, the local motion thresholds are adaptively adjusted. The adaptive adjustment of quantization thresholds are optionally also applied to temporal noise reduction and cross-color suppression sub-systems.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 is a table summarizing various considered global motion scenarios and their combinations.

FIG. 11a above shows the tap structure when the current input field is ODD parity. Taps from three successive input video fields are considered.

FIG. 11b shows the equivalent tap structure when the current field is EVEN parity. Each tap is itself horizontally filtered over several pixels in a line of the field.

DETAILED DESCRIPTION OF THE INVENTION

Figure 1A:
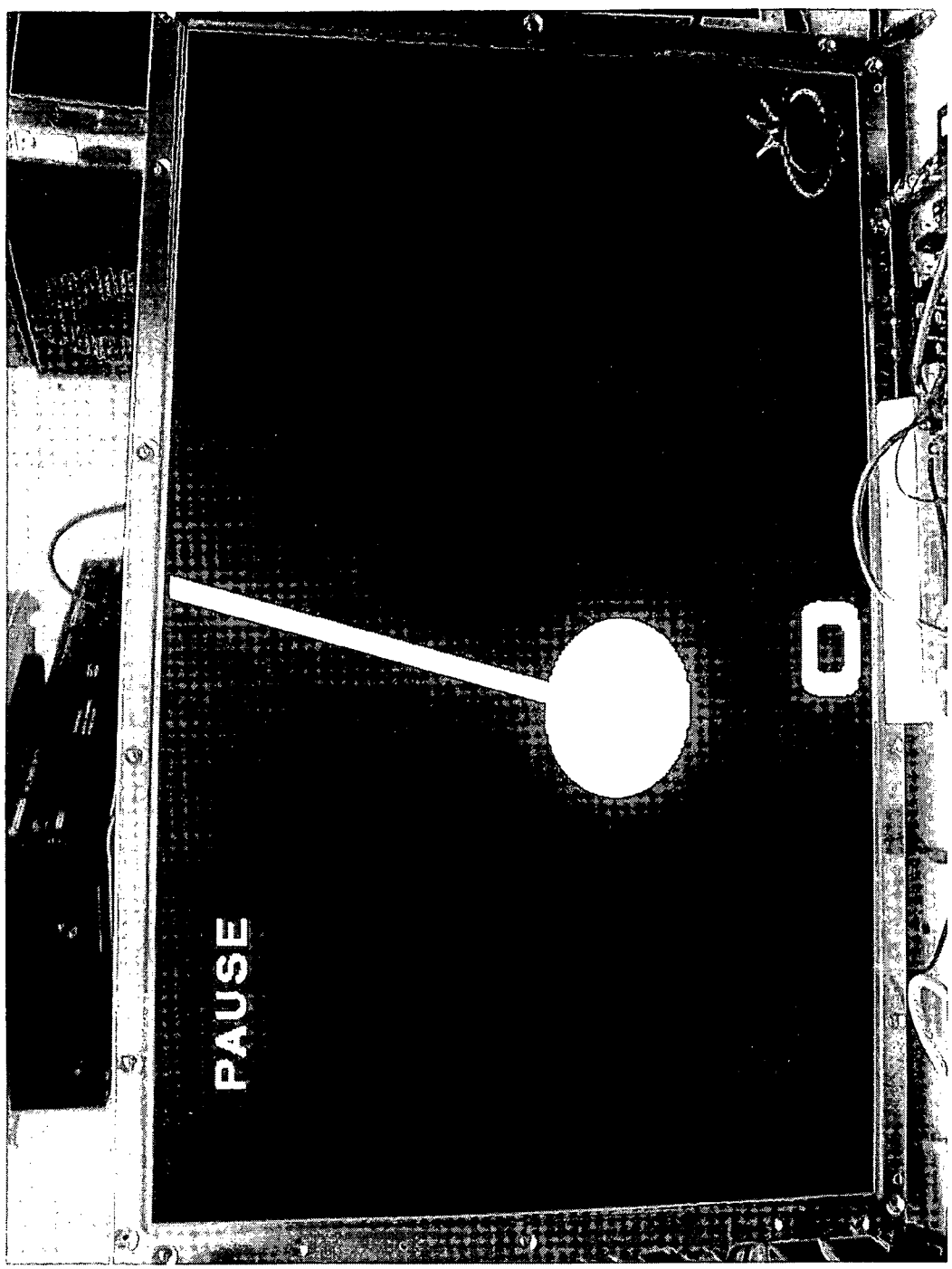
FIGS. 1a,b show an example image from a sample video sequence (moving pendulum) and its associated global motion R and S signals.

Reference will now be made in detail to a particular embodiment of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

Motion Adaptive Deinterlacing and Local Motion Quantization Thresholds

An interlaced video signal comprises odd fields (lines 1, 3, 5, . . . ) and even fields (lines 2, 4, 6, . . . ). A deinterlacing video processing system produces a progressive video output signal from an interlaced video input signal for viewing on a progressive display device. Instead of performing simple fields merging (i.e. static mesh) to deinterlace the input video, a combination of vertical interpolation and temporal interpolation is performed in order to obtain a high quality deinterlaced image frame which has a minimum of flickering artifacts in the static areas and a minimum of feathering artifacts in the moving areas. In order to better achieve this goal, local motion (such as on a pixel-by-pixel basis) in the input sequence can be estimated in order to separately process the static and the moving portions of the image depending upon the presence and level of local motion in the vicinity of each pixel. This is referred to as motion adaptive deinterlacing (MADI), and two main tasks of such a MADI system are:

1. Motion detection, comprising detecting the level of local motion for each pixel and/or its neighborhood; and 2. Deinterlacing, thereby producing a progressive frame.

In order to detect the presence of local motion in the input video sequence, two fields of the same polarity (i.e. even and even, or odd and odd) are used by the MADI system in order to compute the value differences (i.e. temporal variation) between each two pixels having the same coordinates in the two fields. In addition, differences between pixel values of two adjacent fields in the vertical direction may be computed in order to recognize the presence of vertical motion. The MADI system then estimates local motion values for each pixel based on the obtained temporal variation, vertical variation and optionally global noise present in the video signal. Once estimated, the local motion values are quantized into a number of levels as indicated by a set of MADI local motion quantization thresholds, which define a set of local motion ranges. The pixels are then deinterlaced by a set of available methods according to the quantized local motion values.

Global-Adaptive Deinterlacing System

While a MADI system as described above does reduce deinterlacing artifacts, scintillation and feathering artifacts are still present in the final deinterlaced sequence. Disclosed herein are global-adaptive deinterlacing systems and methods for reduce scintillation and feathering artifacts by adaptively adjusting the MADI local motion quantization thresholds according to the amount of global motion present in the video sequence. A set of global motion "scenarios" are defined for the purpose of classifying sequences, and a number of global motion indicators are used to detect on a field-by-field basis different global motion scenarios. Depending on the global motion scenario of a field, the local motion thresholds are dynamically adjusted, thereby minimizing scintillation artifacts (generally present in low motion images) and feathering artifacts (generally present in high motion images) when deinterlacing the field.

Global Motion Indicators: R and S Signals

Two signals, hereinafter referred to as R and S signals, are used as initial indicators of the amount of global motion present in the input image. These signals may be generated by a Film Mode detection block of the de-interlacer system, or they may be separately computed. The R and S signals are defined as functions of the incoming fields as follows:

| | |
|---|---|
| c = curr_field | Luma values of the current field in the interlaced video signal (can be even or odd) |
| p = prev_field | Luma values of the previous field (in time) in the interlaced video signal (when c is even p is odd, and vice versa). |
| $p_{-1}$ = field previous to p | Luma values of the field previous to p (in time). |
| $R = c - p_{-1}$ ← R = sum(c − $p_{-1}$). | Pixel-to-pixel subtraction and conversion of result to a scalar R = sum(c − $p_{-1}$). |
| S = c − p ← S = sum(c − p). | Pixel-to-pixel subtraction and conversion of result to a scalar S = sum(c − p). |

Figure 1B:
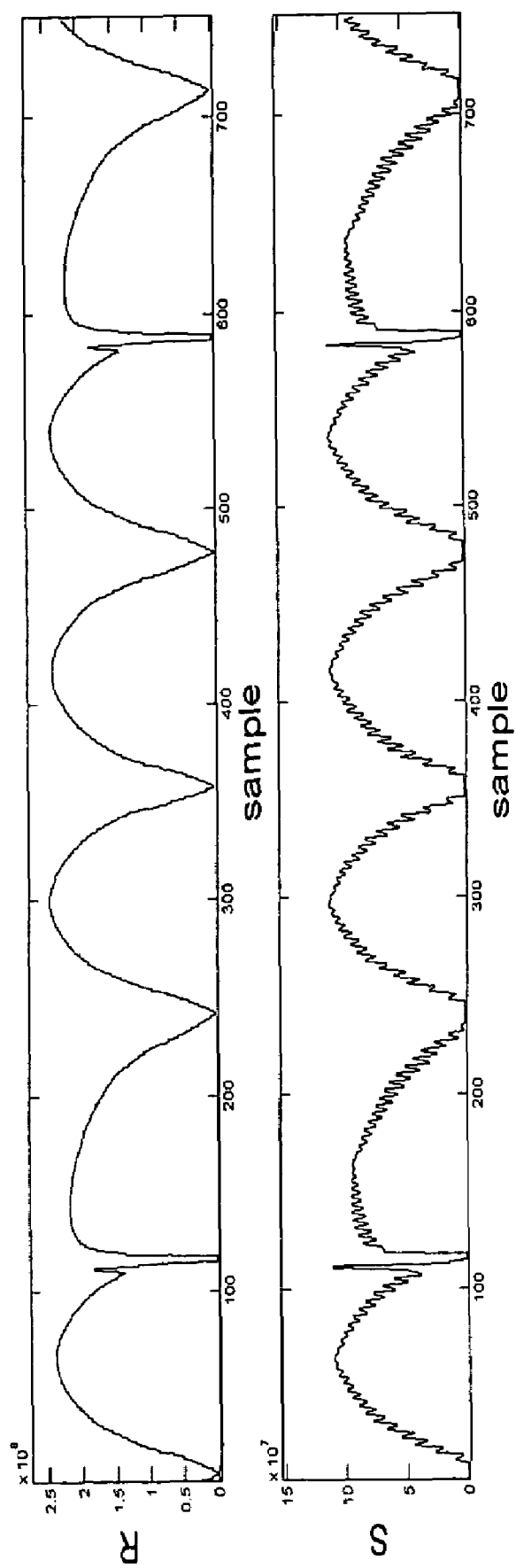

Note that when the interlaced video signal comprises little global motion, c and p are close in value and their difference is small. Furthermore, when an object moves from an odd field to an even field (or vice versa), the spatial shift causes a corresponding increase in the result of the subtractions. An example image from a sample video sequence is shown in FIG. 1*a*, and the R and S signals for the sequence are shown in FIG. 1*b*.

Correcting the R and S Signals

Since the R and S global motion indicators are obtained by performing Luma subtractions between different video fields, the signals are dependent on the Luma levels. For example, if a specific video sequence comprising objects moving at a fixed speed is played with two different Luma levels (i.e. two different brightness levels), the two obtained sets of R and S values corresponding to each Luma level will be different.

Figure 2A:
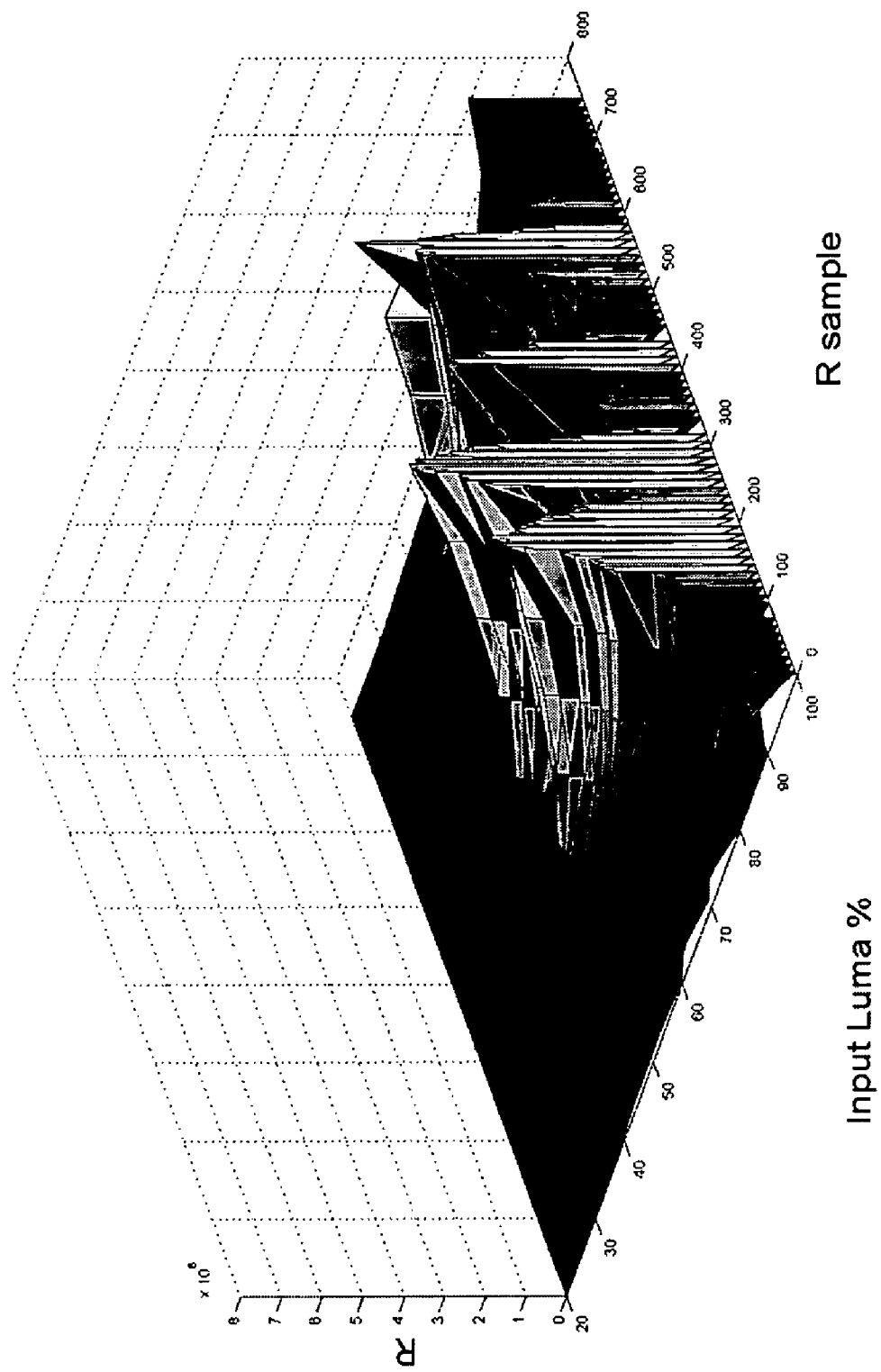
FIG. 2a is a 3-D graph showing an R global motion signal as a function of Luma level obtained from a sample video sequence.
Figure 2B:
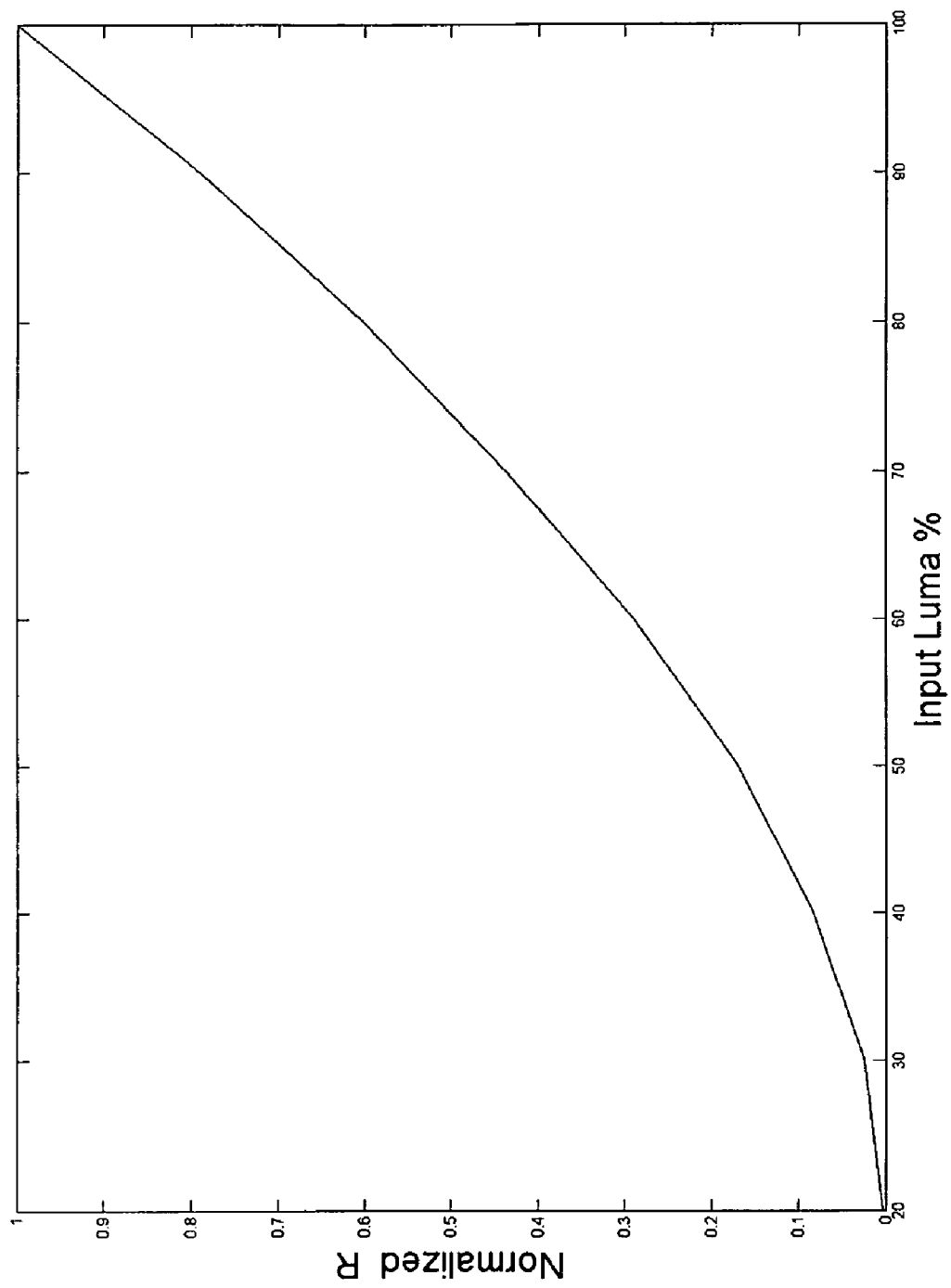
FIG. 2b is a 2-D graph showing a normalized R global motion signal as a function of Luma level.
Figure 3A:
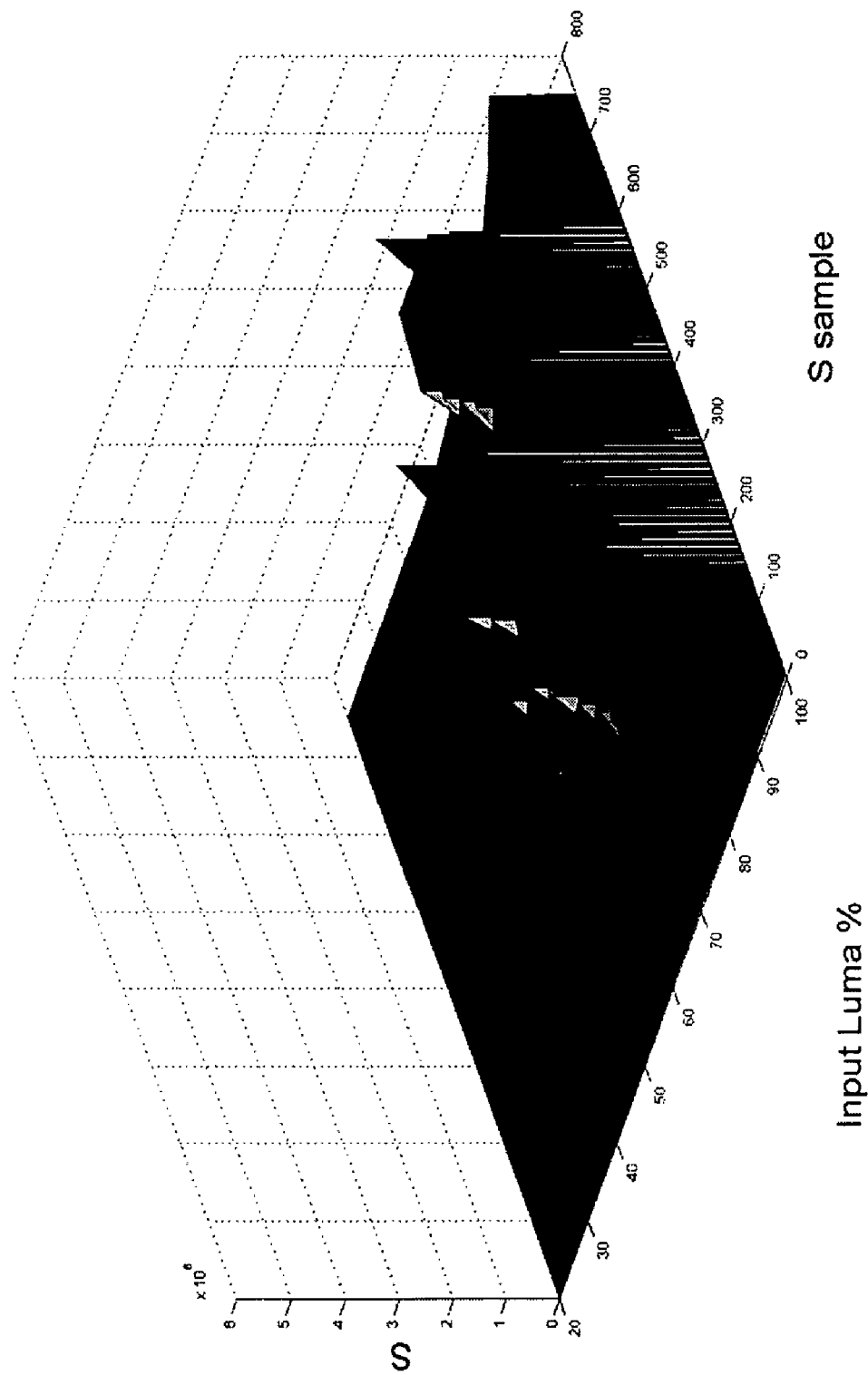
FIG. 3a is a 3-D graph showing an S global motion signal as a function of Luma level obtained from a sample video sequence.
Figure 3B:
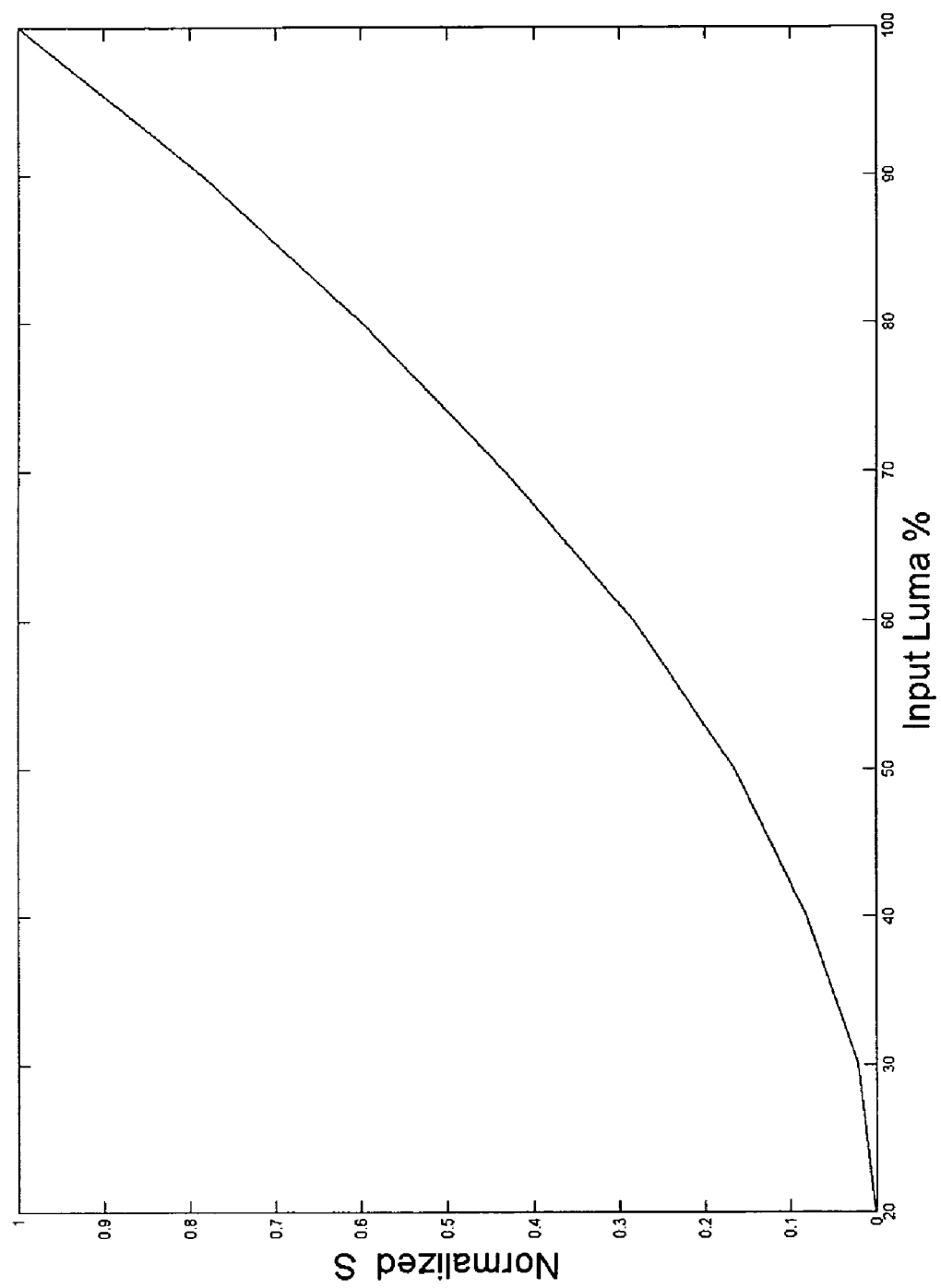
FIG. 3b is a 2-D graph showing a normalized S global motion signal as a function of Luma level.

FIGS. 2*a,b* and 3*a,b* are 3-D and 2-D graphs showing actual samples of R and S values and illustrating how these global motion values vary exponentially with respect to the maximum Luma value contained in the image. FIG. 2*a* plots the R signal as a function of Luma level and a sample video sequence ("R sample"), and FIG. 2*b* shows the R signal as a function of Luma level. FIG. 3*a* plots the S signal as a function of Luma level and a sample video sequence ("S sample"), and FIG. 3*b* shows the S signal as a function of Luma level. The graphs were generated with the same sample video sequence.

When the maximum Luma levels in the incoming video fields vary, the magnitude of the R and S signals are altered (scaled) by a factor $f(Y_{max})$. Therefore, from this moment we will refer to the R and S signals as the uncorrected $S_{uncorr}$ and $R_{uncorr}$ signals.

$$S_{uncorr} = S \cdot f(Y_{max})$$

$$R_{uncorr} = R \cdot f(Y_{max})$$

where $Y_{max}$ represents the maximum Luma value in the video field. The function $f$ is an exponential function as the ones shown in FIGS. 2*b* and 3*b*.

Figure 4A:
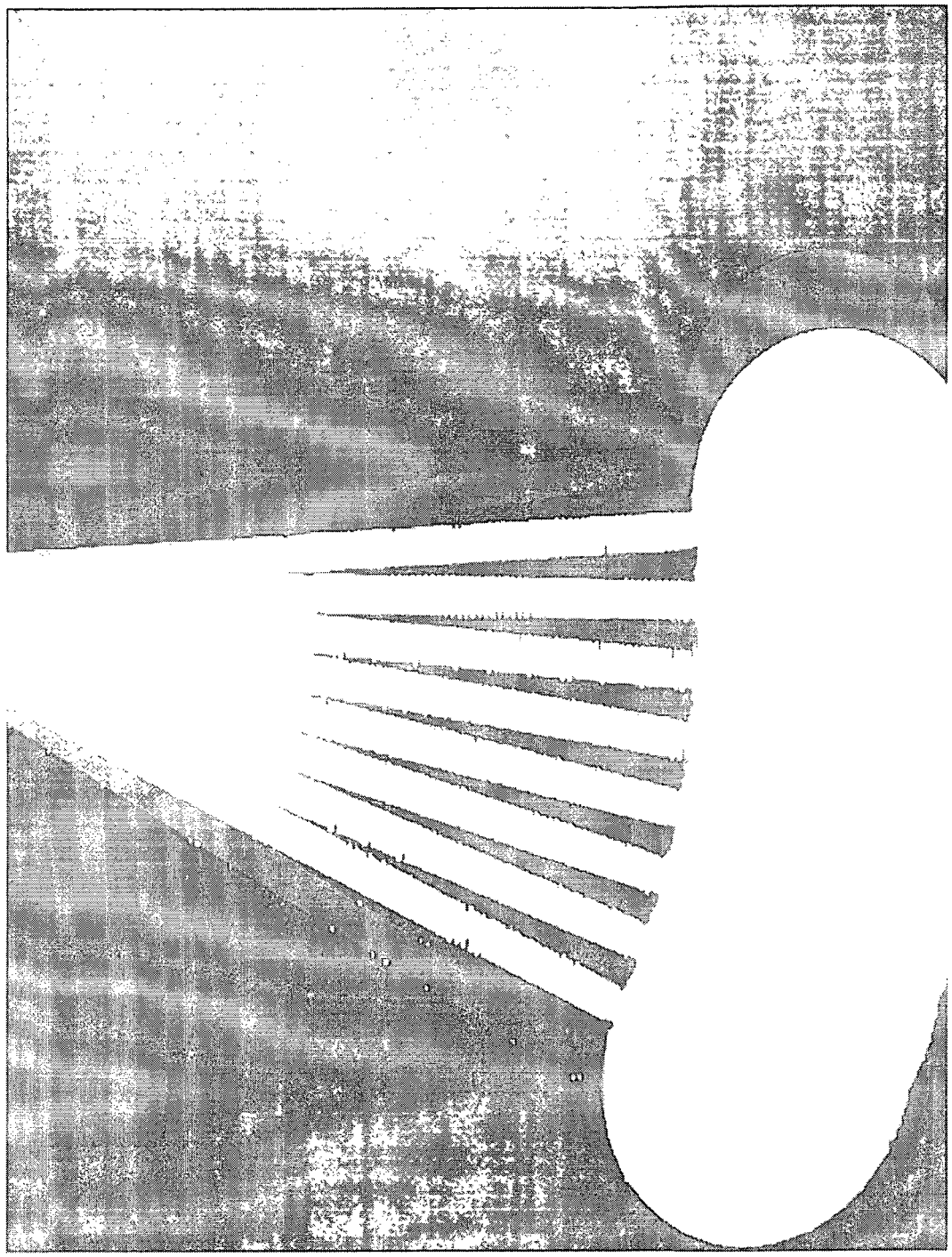
FIG. 4a shows a moving pendulum with the Luma level slightly decreased causing feathering artifacts to start to appear.

The Luma dependency problem affects the performance of the deinterlacer as illustrated by the examples of FIGS. 4*a,b,c* all having the same fixed local motion threshold quantizer settings. The local motion thresholds were adjusted in such a way that the moving object starts showing feathering artifacts when the Luma level is set to the default value of 100%. FIG.

Figure 4B:
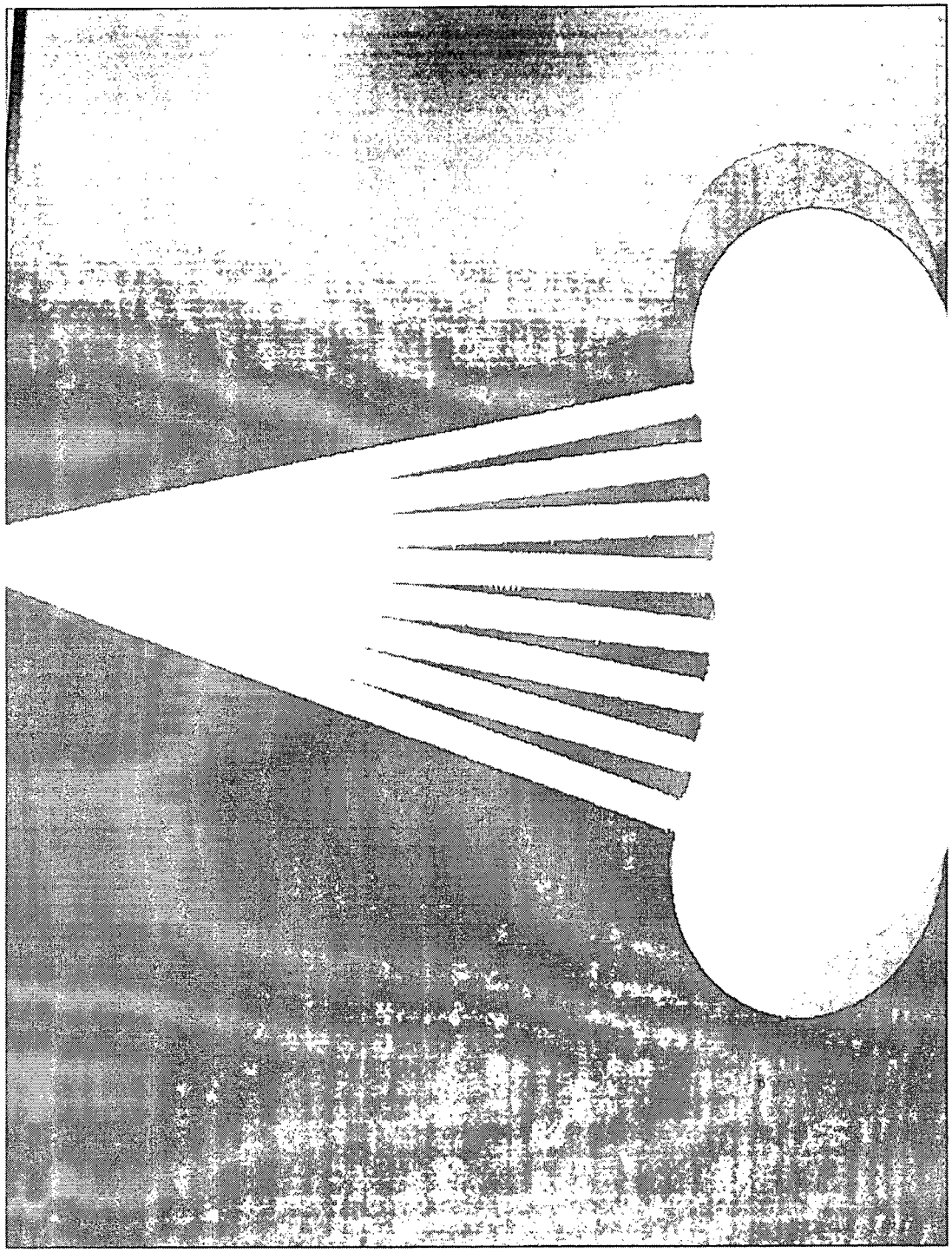
FIG. 4b shows the same moving pendulum with Luma level set to 100%. In this case the system is tuned and the image is displayed without feathering artifacts.

4a shows a moving pendulum with the Luma level set to the default 100%. In this case the moving pendulum starts to show feathering. FIG. 4b shows a the same moving pendulum moving at the same speed but with the Luma set to 120%. In this case the feathering artifacts do not appear because the MADI system produced a vertically-filtered de-interlaced image as a result of the higher local motion values being above the fixed local thresholds.

Figure 4C:
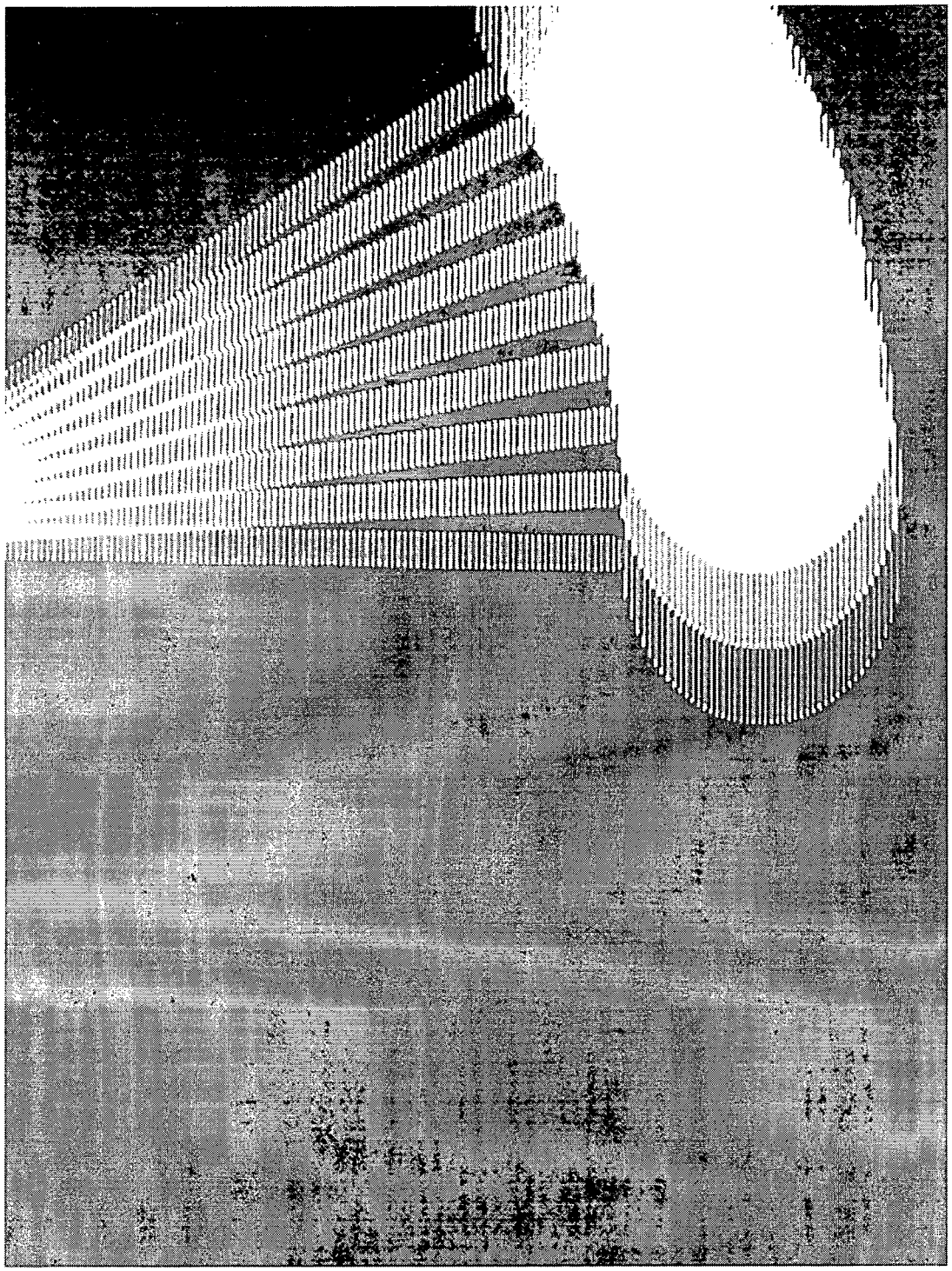
FIG. 4c shows the same moving pendulum with Luma level decreased to the point in which the moving pendulum shows a high degree of feathering artifacts.

In contrast, FIG. 4c shows the same moving pendulum moving at the same speed but with the Luma set to 80%. In this case the feathering artifacts clearly appear on the image because the MADI system produced a filed-paired (static-mesh) de-interlaced image as a result of the lower local motion values being below the fixed local thresholds.

In order to remove or at least reduce the dependency on the Luma level, an inverse function $$g(Y_{max}) = \frac{1}{f(Y_{max})}$$

is defined for multiplication by the $R_{uncorr}$ and $S_{uncorr}$ values as follows:

$$S_{corr} = \frac{1}{g(Y_{max})} \cdot S_{uncorr}$$

$$R_{corr} = \frac{1}{g(Y_{max})} \cdot R_{uncorr}$$

Where the $S_{corr}$ and $R_{corr}$ corrected values represent acceptable approximations of the desired R and S indicators.

Figure 5A:
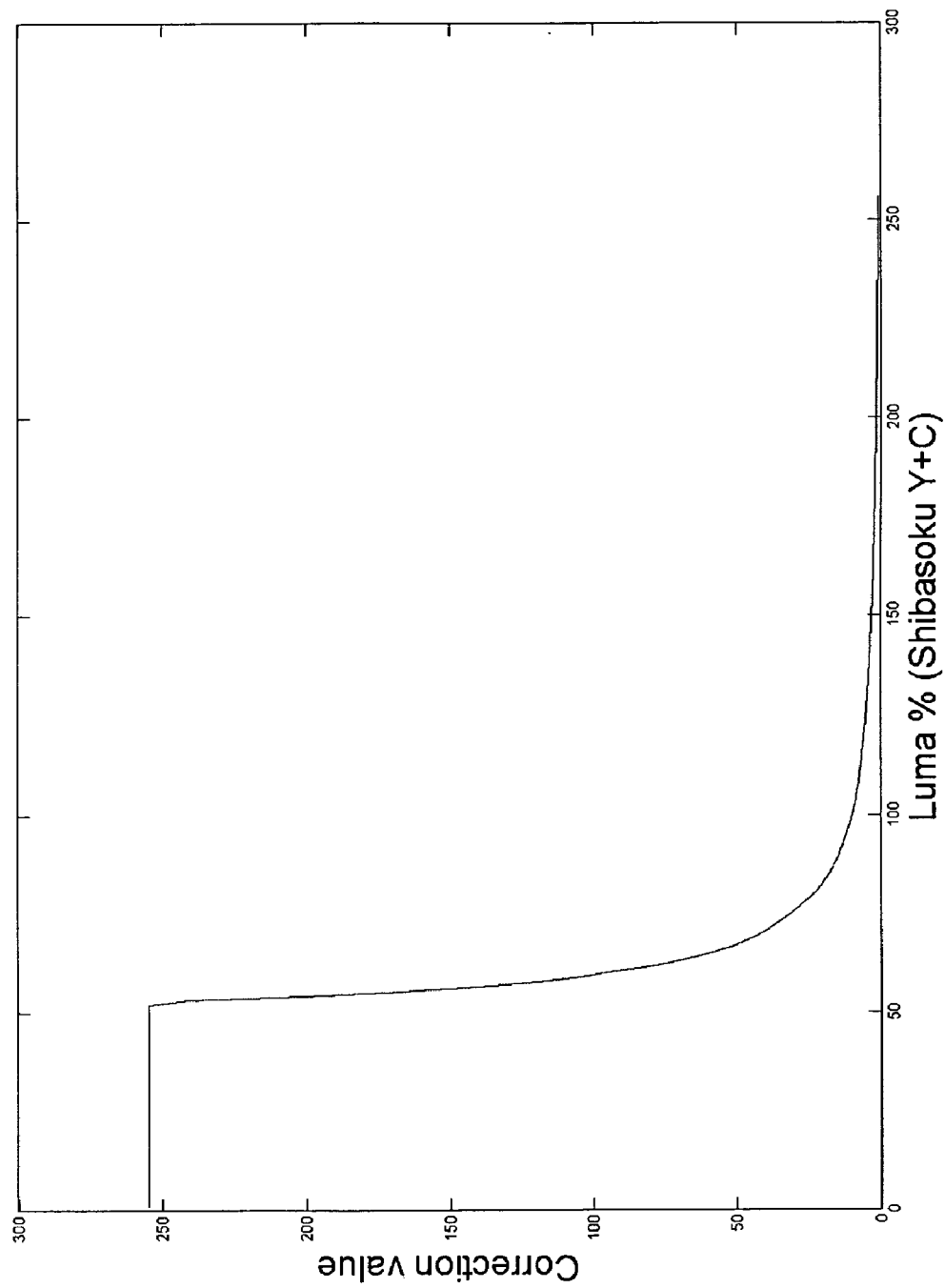
FIGS. 5a,b illustrate examples of R and S global motion signals correction functions.
Figure 5B:
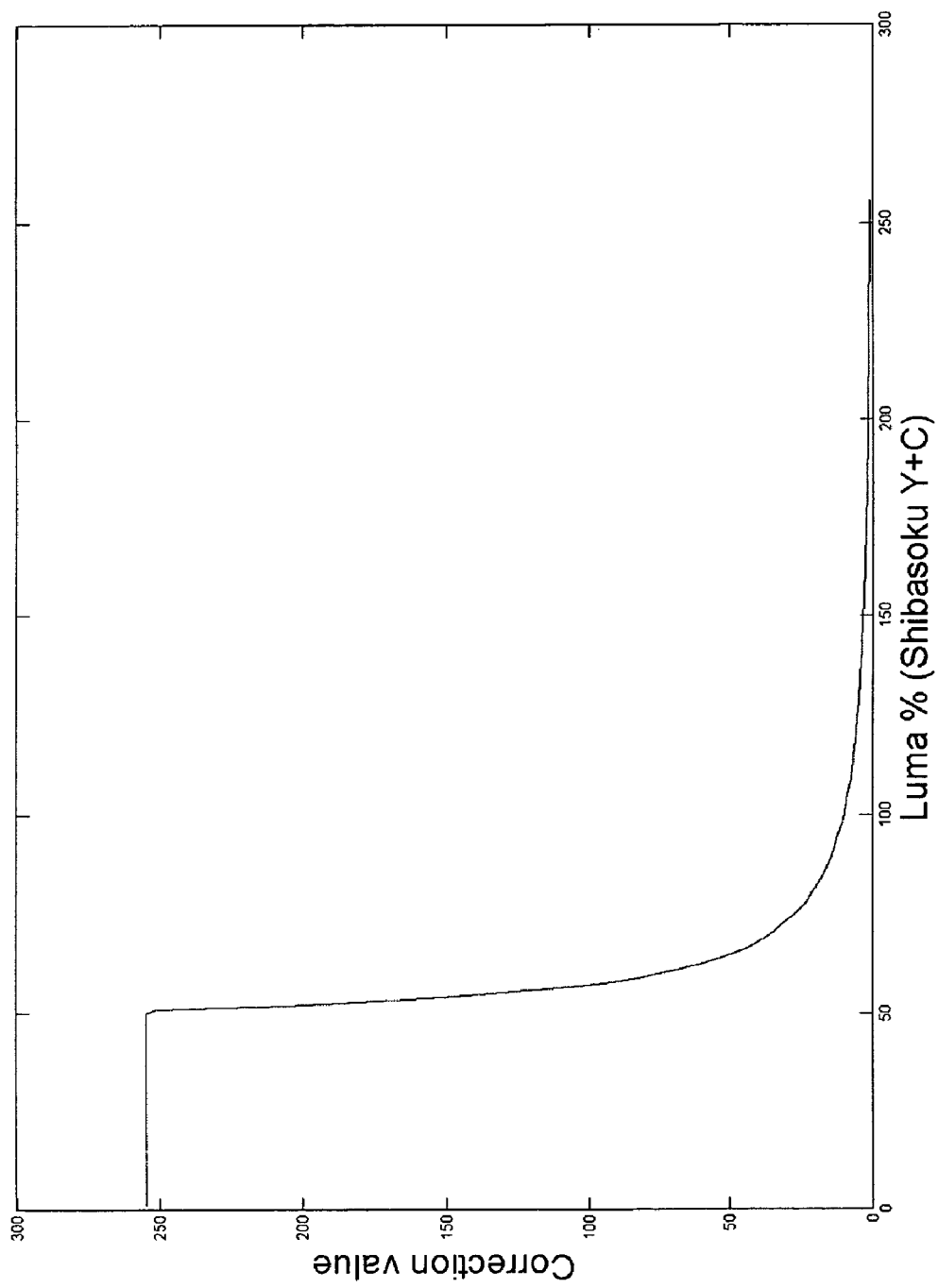

By way of example, the inverse function $g(Y_{max})$ may be defined as a 256-entry (for an 8-bit system) 8.8 Fixed-Point format look-up table (for example implemented in firmware or hardware). FIGS. 5a,b show examples of correction functions.

In these correction functions LUT, an entry is selected according to the maximum Luma level (index) detected in the field. Then the entry is multiplied by the $S_{uncorr}$ and $R_{uncorr}$ values. In the shown correction functions the entries corresponding to Luma values lower than 128 (50%) are clipped in order to avoid over-correction caused by a division by zero. For Luma values equal or higher than 235 (ITU???-601 standard) the correction value is clipped to 1.

In order to correct the pairs of $S_{uncorr}$ and $R_{uncorr}$ values for a given field, the maximum Luma level of the field is determined. The maximum Luma value can be directly computed, or may simply be available from the deinterlacing system. For example, a MADI chip may have a register making available the maximum Luma value detected in the current field. This value is then used as an index to a correction look-up table in order to properly select a correction factor which will be multiplied with the $S_{uncorr}$ and $R_{uncorr}$ values to obtain the $S_{corr}$ and $R_{corr}$ values that will be used as the corrected global motion indicators.

Figure 6A:
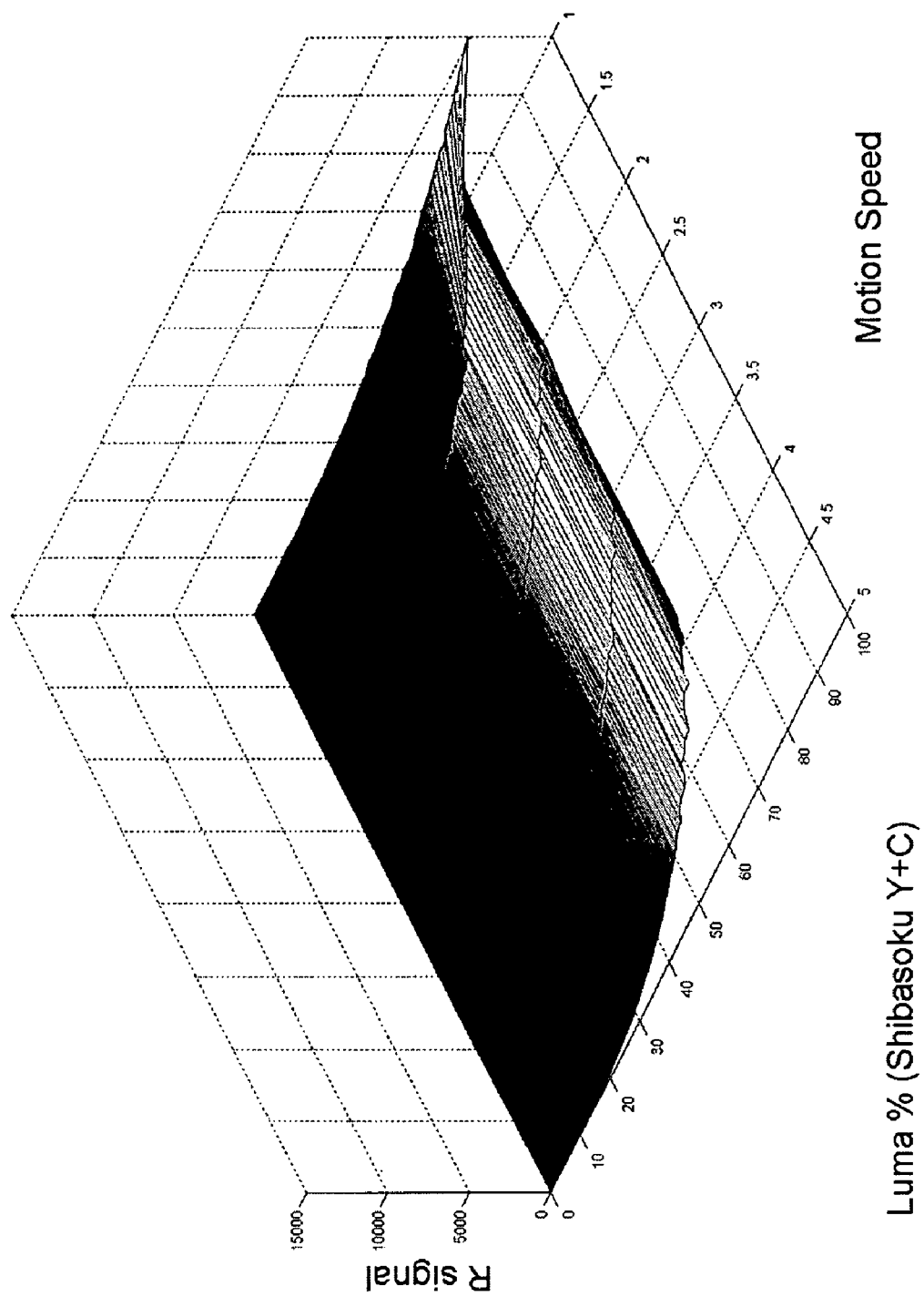
FIG. 6a is a graph showing an R global motion signal (not corrected) as a function Luma level and motion speed, generated from a sample video sequence. The S signal behaves similarly.
Figure 6B:
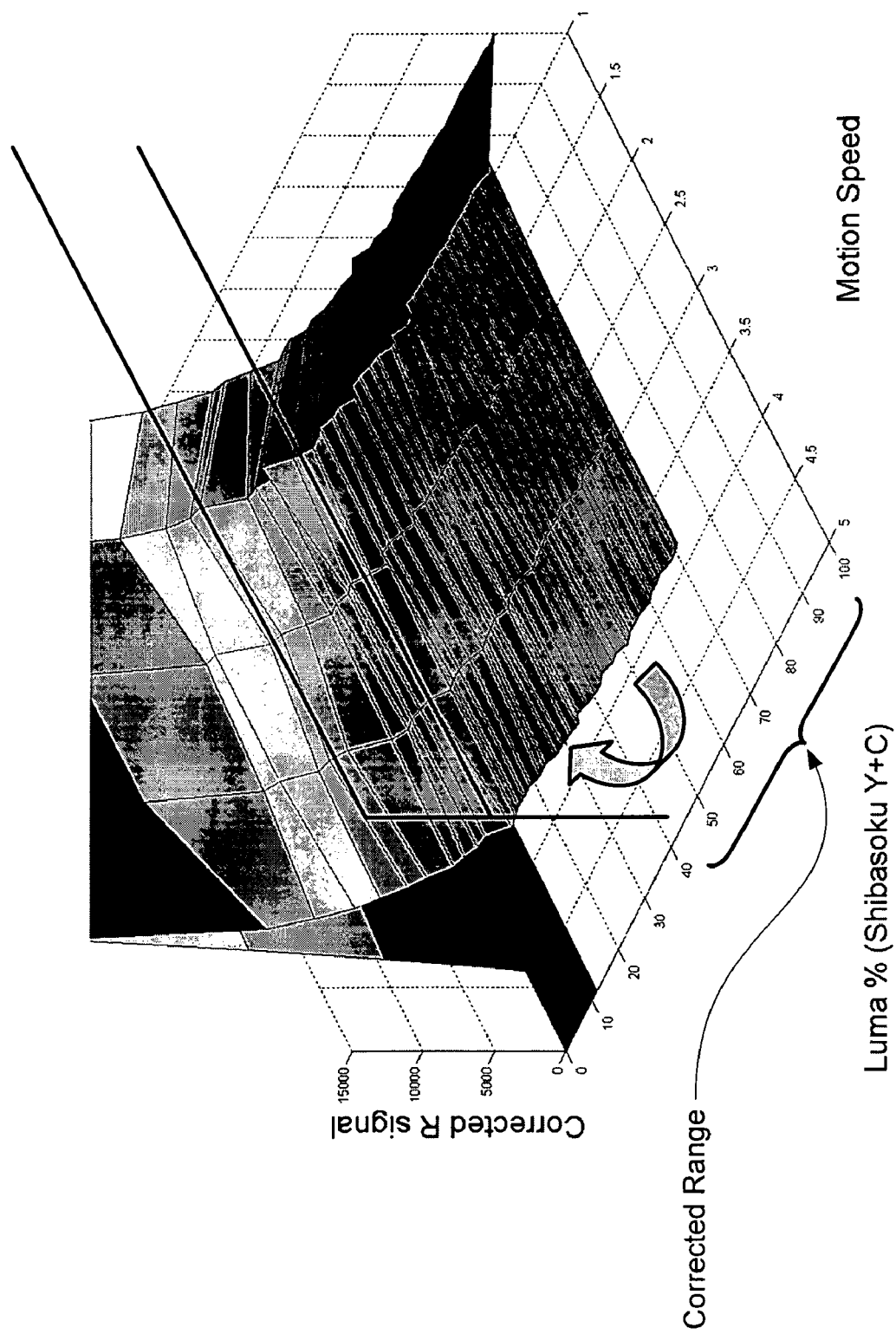
FIG. 6b is a graph showing a corrected $R_{corr}$ global motion signal, compensated for the observed dependence on the Luma value. The $S_{corr}$ is corrected similarly.

FIGS. 6a,b are 3-D graphs showing an example R signal before and after correction. FIG. 6a is a graph illustrating an uncorrected R signal as a function Luma value and motion speed, generated from a video sequence. Note that reducing the Luma value in turn reduces the $R_{uncorr}$ signal, while as a motion indicator it is desirable to have the $R_{uncorr}$ signal be independent of the Luma value. Accordingly, as shown in FIG. 6b, the signal is corrected (for the Luma level range of about 50-100%), compensating for the observed dependence on the Luma value.

This avoids the reduction of the global motion magnitude values and hence generates a reliable (nearly-constant) pair of $S_{corr}$ and $R_{corr}$ values (for the range of Luma levels 50-100%). Thereby improving de-interlacer robustness by retaining the high performance of the deinterlacer in dark scenes.

Motion Scenarios

A set of motion scenarios is defined in order to classify fields depending on the level of global motion and presence of vertical motion pattern. The following scenarios are used:

Low motion scenario: Indicating still images or very low global motion images.

Medium motion scenario: Indicating medium global motion images.

High motion scenario: Indicating high global motion images.

Vertical motion scenario: Indicating images with vertical global motion pattern.

Figure 7:
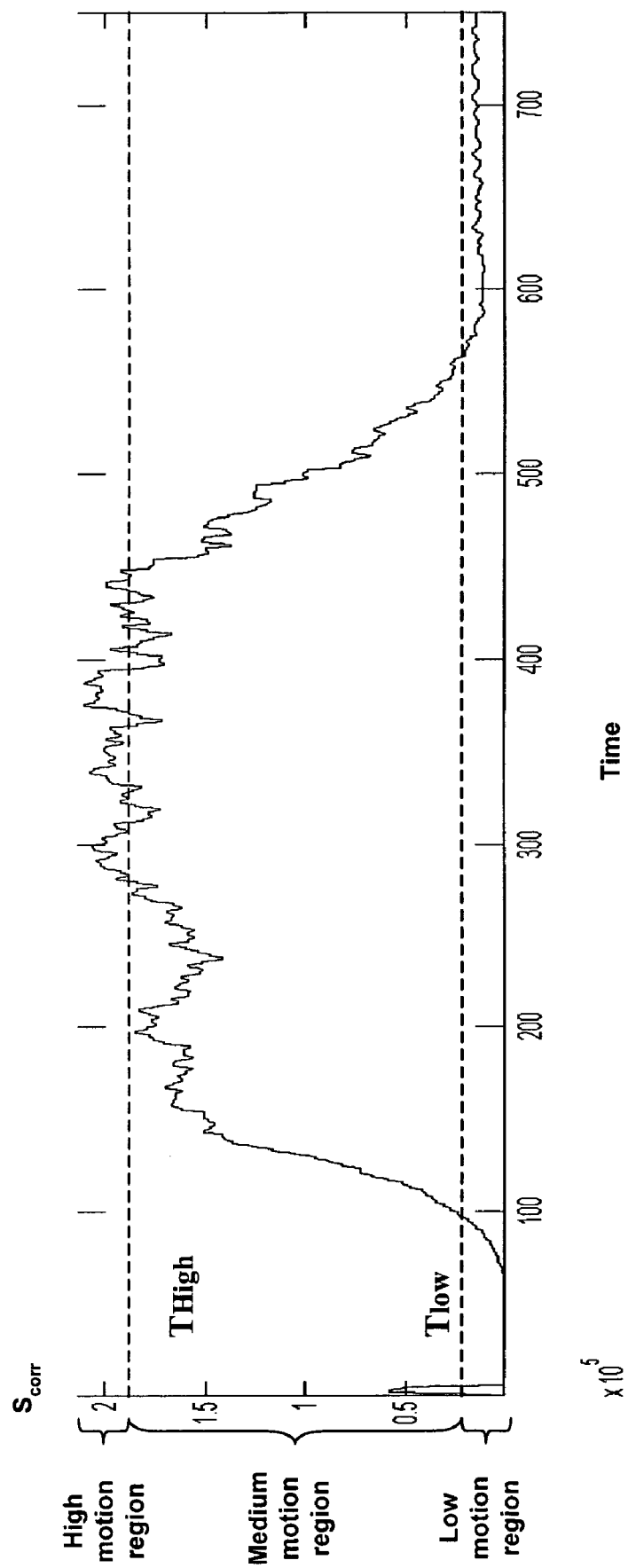
FIG. 7 is a graph of the $S_{corr}$ global motion signal for a sample video sequence together with the three regions indicating three global motion scenarios. These same three regions are defined for the $R_{corr}$ signal as well. The regions are determined by defining the global motion thresholds Tlow and Thigh.

Given an image in a sequence, a scenario is determined based on the $R_{corr}$ and $S_{corr}$ signals. The scenario indicates appropriate adjustments to the local motion thresholds according to the amount of global motion and/or the presence of vertical motion in the image. By way of example, the following definitions have been found to work well:

$S_{corr}$ and $R_{corr}$ values below the threshold value of Tlow=3 (higher 16 bits of a 32-bit word) indicating a low global motion scenario, $S_{corr}$ and $R_{corr}$ values between the Tlow=3 and Thigh=4800 indicating a medium global motion scenario, and $S_{corr}$ and $R_{corr}$ values above Thigh=4800 indicating a high global motion scenario. FIG. 7 shows a graph of the $S_{corr}$ signal for a sample video sequence together with three arbitrary regions indicating the global motion scenarios. The table of FIG. 8 summarizes various considered global motion scenarios and their combinations. Currently, only the non-shaded rows are being considered.

Adjusting Quantizer Threshold Values of a Motion Adaptive De-Interlacer

Generally, the local motion value of a specific pixel in a given field are determined by computing a function of pixel Luma and/or Chroma, involving the specific pixel (and its neighbors) contained in the current, previous and previous$_{-1}$ fields.

Because of cost and computational overhead reasons, the obtained local motion value for the analyzed pixel is quantized hence reducing its resolution.

If the thresholds in the quantizer are adjustable, then the distribution of local motion codes can be adjusted accordingly.

Therefore, adjusting the quantizer threshold values essentially redistributes the sensitivity of the quantizer. If the quantizer thresholds are set to a relatively low value, then the Motion Adaptive De-interlacer will treat most of the pixels as if they had high local motion. Consequently, slow moving objects will exhibit scintillation artifacts.

On the other hand, if the quantizer thresholds are set to a relatively high value, then the Motion Adaptive De-interlacer will treat most of the pixels as if they had low local motion. Consequently, fast moving objects will exhibit feathering artifacts.

As described above, the present invention adjusts the local motion quantization thresholds according to the amount of global motion. As an example, the local motion values may be originally represented by 8-bit numbers and subsequently quantized by a 2-bit quantizer into four levels indicated by a set of three local motion quantization thresholds $MADI\_QUANT\_THRESH_0$, $MADI\_QUANT\_THRESH_1$ and $MADI\_QUANT\_THRESH_2$, as follows:

Local motion level 0: local motion<$MADI\_QUANT\_THRESH_0$

Local motion level 1: $MADI\_QUANT\_THRESH_0 \leq$ local motion<$MADI\_QUANT\_THRESH_1$ Local motion level 2: $MADI\_QUANT\_THRESH_1 \leq$ local motion<$MADI\_QUANT\_THRESH_2$ Local motion level 2: $MADI\_QUANT\_THRESH_2 \leq$ local motion Thus, in this example, a quantized local motion value obtained for a pixel indicates which one of four available deinterlacing methods will be used to deinterlace the pixel.

Feathering artifacts occur when the pixels and lines of a moving object are wrongly deinterlaced by the use of the "fields pairing" technique. The effect is a misalignment of the moving object pixels visible as horizontal lines. This problem can be improved by lowering the values of the local motion thresholds. Scintillation artifacts occur when the pixels and lines of a static object are wrongly deinterlaced by the use of the "spatial processing" (vertical filtering) technique. The effect is a flickering artifact on the static object pixels. This problem can be improved by raising the values of the local motion thresholds.

The thresholds start out with a set of "default" values. By way of example, default values of approximately $MADI\_QUANT\_THRESH_0=6$, $MADI\_QUANT\_THRESH_1=8$ and $MADI\_QUANT\_THRESH_2=15$ have been found to work well. In order to deinterlace an incoming field, first a global motion scenario is identified for the field as described above. If the field exhibits a medium motion scenario, the default thresholds remain in place (or are reverted to) and used by the quantizer to determine local motion values for the pixels in the field and choose a deinterlacing method accordingly. However, if the field comprises a low motion scenario, the probability of scintillation artifacts to occur gets increased. In order to prevent the presence of these artifacts, the local motion regions in the quantizer are re-distributed accordingly by raising the local motion thresholds.

By way of example, an adjustment of approximately $MADI\_QUANT\_THRESH_0=13$, $MADI\_QUANT\_THRESH_1=14$ and $MADI\_QUANT\_THRESH_2=15$ has been found to work well.

On the other hand, if the field comprises a high motion scenario, the thresholds are lowered accordingly. By way of example, an adjustment of approximately $MADI\_QUANT\_THRESH_0=4$, $MADI\_QUANT\_THRESH_1=5$ and $MADI\_QUANT\_THRESH_2=15$ has been found to work well. As a result, presence of global motion appropriately affects the local motion regions used by the deinterlacer in order to reduce artifacts such as scintillation and feathering.

Vertical Motion Pattern Detection

Figure 9:
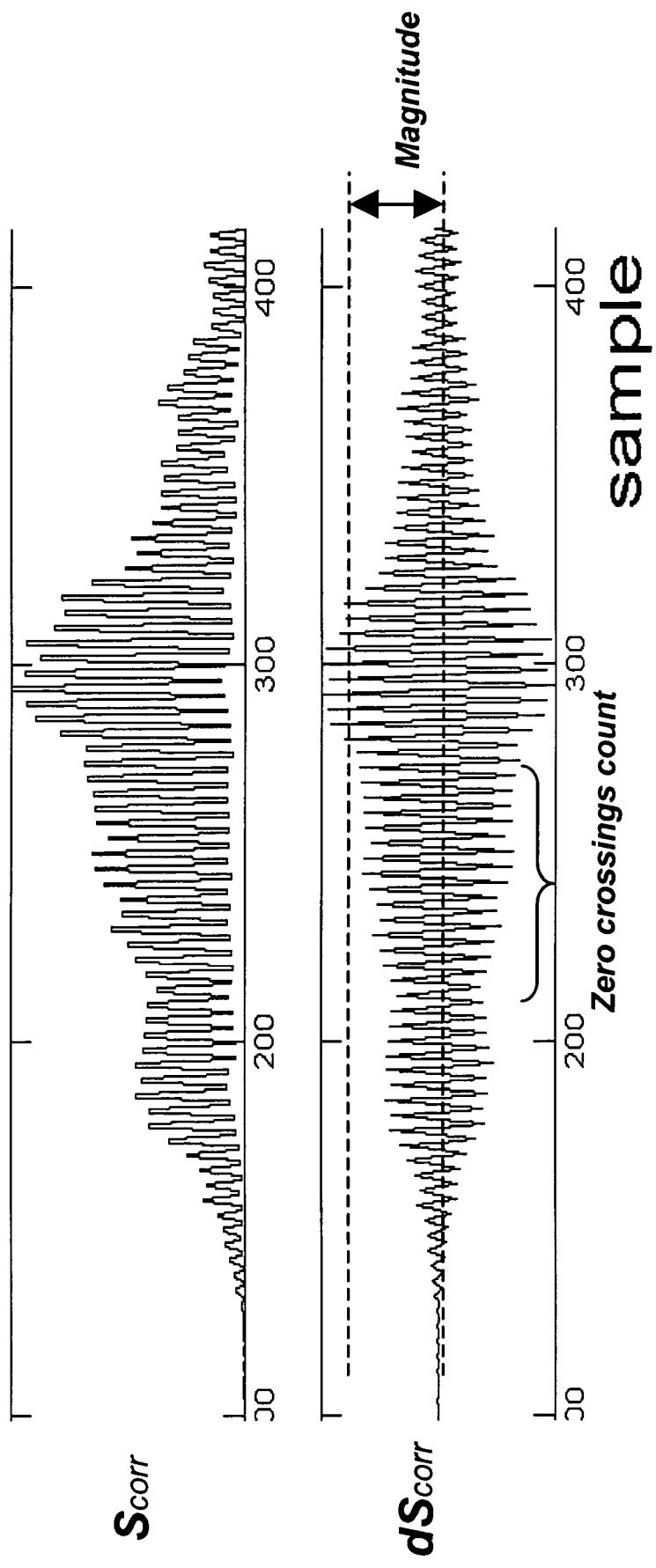
FIG. 9 shows two graphs of the $S_{corr}$ and $dS_{corr}$ signals and indicates a count of the number of zero crossings of $dS_{corr}$. The $dS_{corr}$ difference signal is used to determine the presence of vertical motion pattern in the image.

Vertical motion may cause artifacts during a medium motion scenario. Vertical global motion is detected in a number of ways. One approach makes use of the $S_{corr}$ signal, as shown in the graph of FIG. 9. A buffer is defined for computing the ongoing incremental difference $dS_{corr}$ between the current value and the previous values of $S_{corr}$, namely: $dS_{corr}$=(current $S_{corr}$)−(previous $S_{corr}$). The incoming samples of $dS_{corr}$ are analyzed on the fly by counting the number of zero crossings, as shown in FIG. 9. If the zero crossings count for a specific period exceeds a specified threshold (e.g. 10), this is an indication that a periodical pattern was detected (which is often exhibited by vertical motion). Following such a detection, the magnitude of the $S_{corr}$ analyzed in order to detect specific scenarios (e.g. vertical pattern and medium global motion), and therefore perform adjustments in the local motion quantizer that produce improvements in the displayed image.

Another approach to vertical motion detection utilizes a vertical motion detector element that detects vertical global motion by way of a four stage process. First, vertical motion of individual pixels is detected. These motion values are used to determine the vertical motion of tiles which divide the input field. Last, the motion values of the tiles in a field are used to determine whether that entire field is judged to be in vertical motion. FIG. 11a above shows the tap structure when the current input field is ODD parity. Taps from three successive input video fields are considered. Taps A and C are from the current input field, B, D, and E are from the previous field of opposite parity to the current field, and C' is from the previous field of the same parity as the current field. FIG. 11b shows the equivalent tap structure when the current field is EVEN parity. Each tap is itself horizontally filtered over several pixels in a line of the field.

The pixel vertical motion is calculated by comparing the top- and bottom-most pixel in the current field with the pixels in the previous field of opposite parity. For example, with an ODD current field, if tap C show high correlation to either tap E and/or tap B, the pixel is said to have downward motion. To prevent motion aliasing, detection of downward motion is predicated on the pixel in the corresponding location in the previous field of the same parity being uncorrelated with the tap in the current field (for example, C and C' must be uncorrelated). Correlation can be measured with either a simple absolute difference or via more elaborate correlation functions. Pixels in vertical motion then cause a tile counter to be either incremented or decremented based on their direction of motion.

The taps in the current field are divided spatially into rectangular tiles. With each tile is associated a counter, which increments of decrements according to the pixel motion calculated above. The tile counter provides a measure of the overall motion of pixels within the tiles: if the tile counter is positive, the pixels are, on average, moving upwards, and if negative, downwards. The counter value is compared with a threshold to provide noise immunity; if the threshold is exceeded, the tile is judged to be in vertical motion. A field vertical motion counter is incremented or decremented based on the direction of the tile motion.

Next, the field motion counter is compared with another threshold to determine if the entire field has vertical motion. This threshold is adaptive based on attributes of the input field, such as parity. This creates a two bit output signal which indicates if the field is in vertical motion, and if so, the direction of motion, up or down.

Finally, a history of the vertical motion is kept over several fields. If this vertical motion is consistent and in the same direction over several fields, a high degree of confidence that vertical motion is real exists. In this case a final one-bit output signal indicates that the input sequence contains vertical motion. This output signal uses hysteresis to prevent noise from causing quick successive changes in the detected vertical motion.

Figure 12:
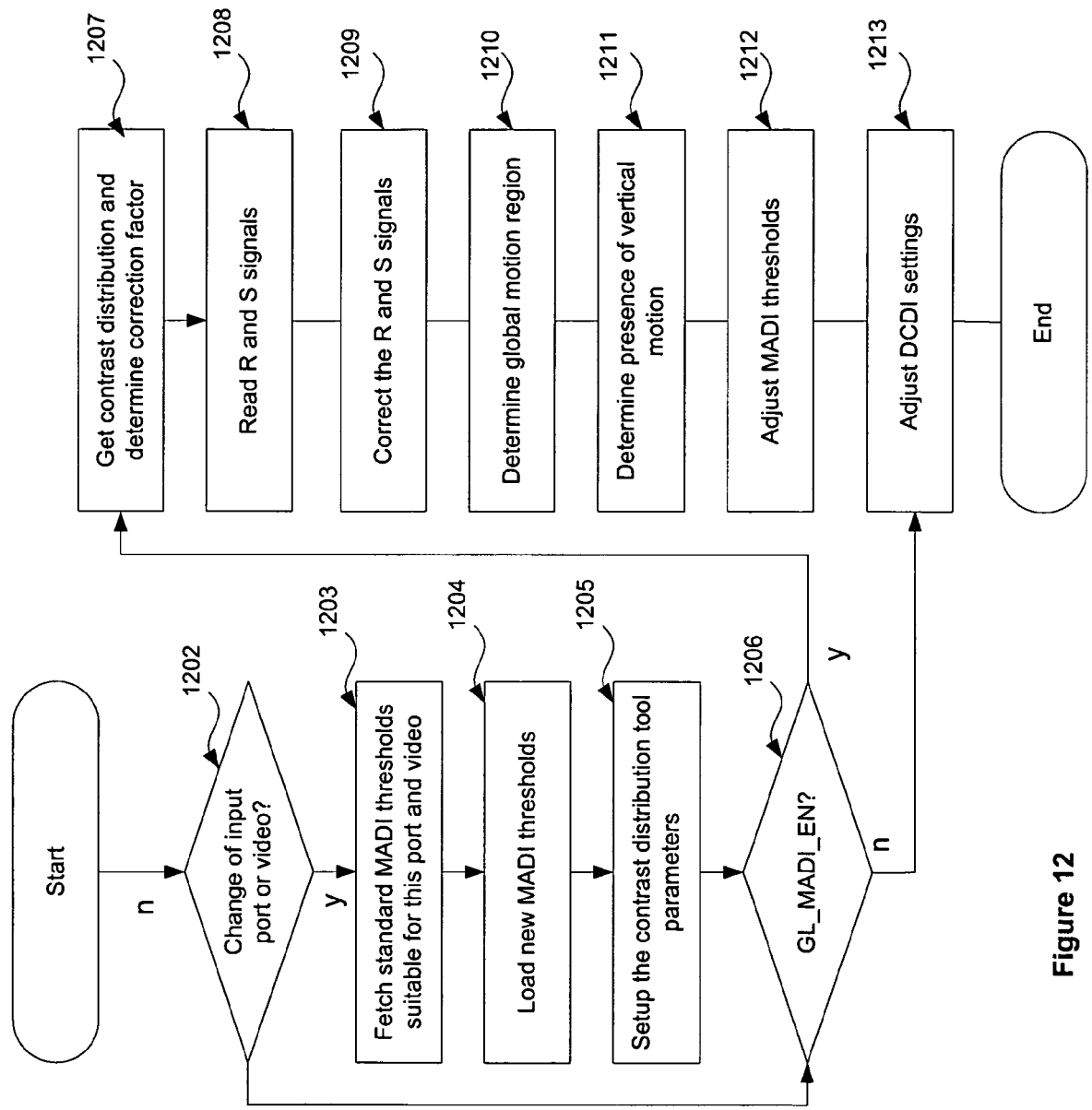
FIG. 12 shows a flow diagram illustrating a method for global adaptive deinterlacing, in accordance with an embodiment of the present invention.

FIG. 12 shows a flow diagram illustrating a method for global adaptive deinterlacing, in accordance with an embodiment of the present invention. At step 1202, if the input port or video is changed, fetch the standard (default) MADI location motion threshold values at step 1203, load them into the MADI local motion quantizer at step 1204, and setup the contrast tool parameters at step 1205, and proceed to step 1206. Otherwise, proceed directly to step 1206. At step 1206, if GL_MADI_EN=0 (i.e. if the global-adaptive system is not enabled) then do not apply the adaptive algorithm. Else (i.e. if the global-adaptive system is enabled), get the contrast distribution and determine correction factor at step 1207. At step 1208, read the R and S signals and correct the R and S signals at step 1209, determine the global motion scenario at step 1210 and determine presence of vertical motion at step 1211. At step 1212, adjust the MADI local motion thresholds according to the global motion scenario and presence of vertical motion, and complete the process by proceeding to step 1213.

Temporal Noise Reduction

Optionally, the deinterlacer may comprise a temporal noise reduction (TNR) component, having a separate local motion values quantizer for increased flexibility. In such an embodiment, an initial noise measurement may be obtained from a sub-system of the deinterlacer, wherein such a sub-system may comprise a noise meter and optionally some digital filtering to produce a reliable noise measurement. This noise measurement may then be combined with the global motion indicators $S_{corr}$ and $R_{corr}$ to automatically adjust both the amount of noise reduction and the local motion thresholds according to the measured noise and global motion. The objective of using the global motion values is to avoid "ghosting" artifacts (blurring) on moving objects that occur when the amount of noise reduction is relatively high in the high-motion objects. The objective of using the noise measurements is to adjust the amount of noise reduction according to the noise present in the image.

Cross Color Suppression

Optionally, the deinterlacer may comprise a cross color suppression (CCS) component, having a separate local motion values quantizer for increased flexibility. In such an embodiment, the quantizer thresholds can be adjusted based on the global motion indicators $S_{corr}$ and $R_{corr}$ in order to reduce blurring of colors and ghosting artifacts in video sequences involving motion.

Figure 10:
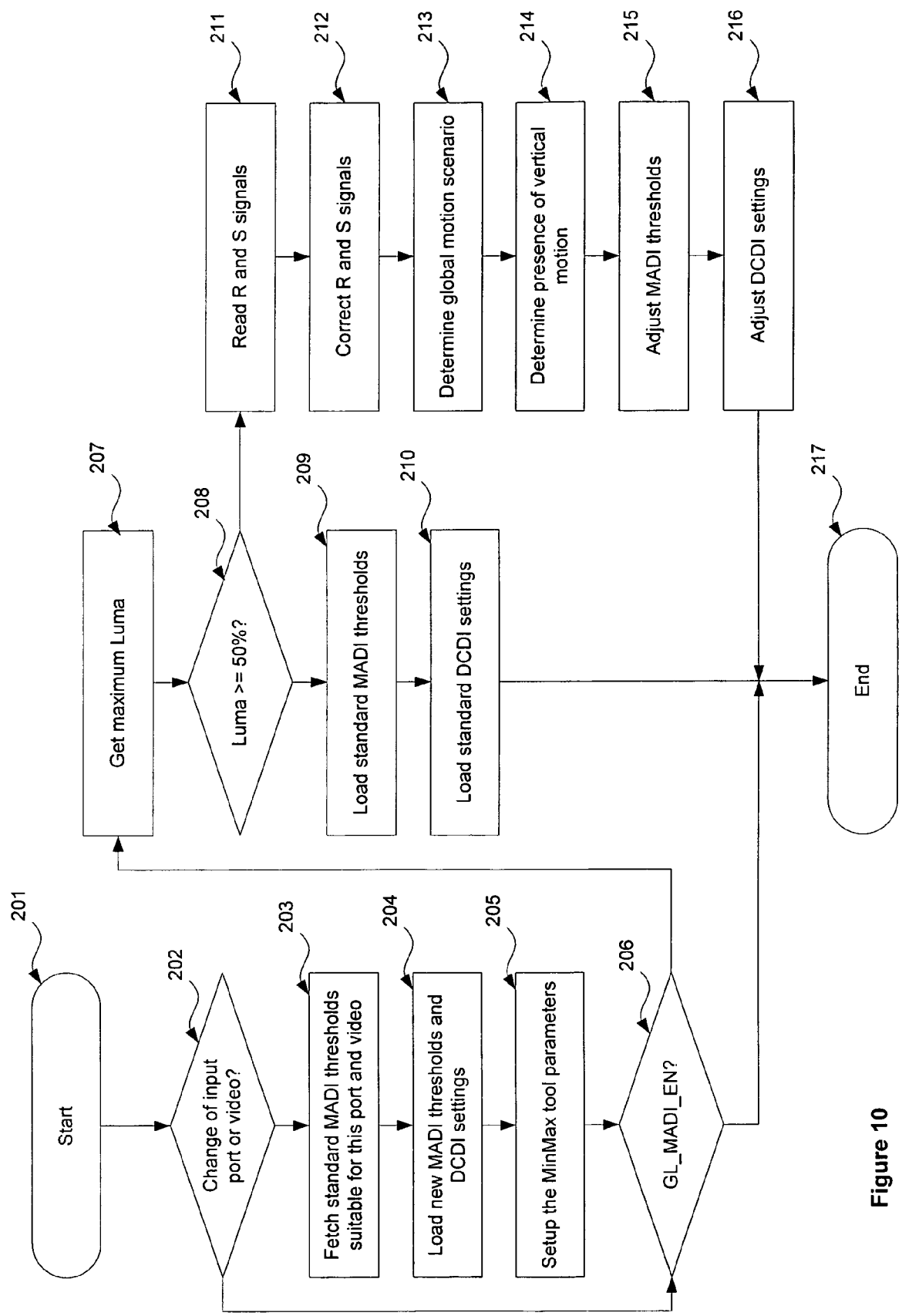
FIG. 10 is a flow chart (high-level) illustrating a method for global adaptive deinterlacing.

FIG. 10 shows a flow diagram illustrating a method for global adaptive deinterlacing, in accordance with an embodiment of the present invention. At step 202, if the input port of video is changed, fetch the standard (default) MADI location motion threshold values at step 203, load them into the MADI local motion quantizer at step 204, and setup the MinMax tool parameters (this tool provides the maximum Luma value in the current field) at step 205, and proceed to step 206. Otherwise, proceed directly to step 206. At step 206, if GL_MADI_EN=0 (i.e. if the global-adaptive system is not enabled, go to step 217 (i.e. do not apply the adaptive algorithm). Else (i.e. if the global-adaptive system is enabled), get the maximum Luma value for the current field at step 207. At step 208, if the maximum Luma value is less than 50% (i.e. the global motion correction can not be applied), load the standard MADI local motion thresholds into the local motion quantizer at step 209, and proceed to step 217, which completes the process. Otherwise (i.e. the global motion correction can be applied), read the R and S signals at step 211, correct the R and S signals at step 212, determine the global motion scenario at step 213 and determine presence of vertical motion at step 214. At step 215, adjust the MADI local motion thresholds according to the global motion scenario and presence of vertical motion, and complete the process by proceeding to step 217.

Foregoing described embodiments of the invention are provided as illustrations and descriptions. They are not intended to limit the invention to precise form described. Other variations and embodiments are possible in light of above teachings, such as implementing the described embodiments in hardware or software.

We claim:

1. A global adaptive deinterlacing method for reducing feathering and scintillation artifacts, comprising:
   determining a contrast distribution;
   determining a correction factor;
   reading an R signal and an S signal, each an initial indicator of global motion in an input image;
   determining a global motion regions based upon the R and S signals; and
   detecting vertical motion of pixels, thereby deriving vertical motion values;
   determining vertical motion of tiles using said vertical motion values and a tile counter; and
   determining whether an entire field is in vertical motion using the vertical motion of tiles and a field motion counter,
   wherein the determining an amount of global motion comprises generating and reading one or more provided global motion indicator signals.

2. The method of claim 1, wherein the determining an amount of global motion comprises computing Luma differences between a current field and a previous field to obtain one or more global motion indicator signals.

3. The method of claim 2, wherein the determining an amount of global motion further comprises obtaining the maximum Luma value for the current field which is used to fetch a correction factor that is multiplied by the uncorrected global motion values in order to perform correction of those global motion values.

4. The method of claim 3, wherein the determining an amount of global motion further comprises using the maximum Luma value to correct the global motion indicator signals and thereby reduce Luma dependency.

5. The method of claim 1, further comprising determining the presence of vertical motion pattern in the video sequence.

6. The method of claim 1, further comprising adjusting one or more temporal noise reduction quantizer thresholds according to the amount of global motion.

7. The method of claim 1, further comprising adjusting one or more cross color suppression local motion quantizer thresholds according to the amount of global motion.

8. A global adaptive deinterlacing system for reducing feathering and scintillation artifacts, comprising:
   a controller for:
   determining an amount of global motion present in a video sequence;
   adjusting one or more local motion quantizer thresholds according to the amount of global motion, wherein the determining an amount of global motion comprises reading one or more provided global motion indicator signals;
   detecting vertical motion of pixels, thereby deriving vertical motion values;
   determining vertical motion of tiles using said vertical motion values and a tile counter; and
   determining whether an entire field is in vertical motion using the vertical motion of tiles and a field motion counter.

9. The system of claim 8, wherein the determining an amount of global motion comprises computing Luma differences between a current field and a previous field to obtain one or more global motion indicator signals.

10. The system of claim 9, wherein the determining an amount of global motion further comprises obtaining the maximum Luma value for the current field.

11. The system of claim 10, wherein the determining an amount of global motion further comprises using the maximum Luma value to correct the global motion indicator signals and thereby reduce Luma dependency.

12. The system of claim 8, the controller further for:
determining the presence of vertical motion pattern in the video sequence.

13. The system of claim 8, the controller further for:
adjusting one or more temporal noise reduction quantizer thresholds according to the amount of global motion.

14. The system of claim 8, the controller further for:
adjusting one or more cross color suppression local motion quantizer thresholds according to the amount of global motion.

* * * * *